US012191795B2

(12) United States Patent
Minami

(10) Patent No.: US 12,191,795 B2
(45) Date of Patent: Jan. 7, 2025

(54) VOLTAGE FLUCTUATION SUPPRESSING DEVICE FOR ALTERNATING CURRENT GENERATOR

(71) Applicant: YAMABIKO CORPORATION, Tokyo (JP)

(72) Inventor: Yusuke Minami, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 18/318,883

(22) Filed: May 17, 2023

(65) Prior Publication Data

US 2023/0396194 A1    Dec. 7, 2023

(30) Foreign Application Priority Data

Jun. 7, 2022  (JP) ................. 2022-091972

(51) Int. Cl.
*H02P 9/00*   (2006.01)
*H02P 9/10*   (2006.01)
*H02P 9/30*   (2006.01)

(52) U.S. Cl.
CPC .............. *H02P 9/102* (2013.01); *H02P 9/305* (2013.01); *H02P 9/008* (2013.01)

(58) Field of Classification Search
CPC .......... H02P 9/102; H02P 9/008; H02P 9/305; H02P 9/14; H02P 9/105
See application file for complete search history.

(56) References Cited

U.S. PATENT DOCUMENTS

| 4,233,555 A * | 11/1980 | Roche ................... H02K 19/34 322/90 |
| 5,739,677 A * | 4/1998 | Tsutsui ..................... H02J 7/24 322/20 |
| 2005/0093520 A1* | 5/2005 | Muramatsu ............ H02K 29/08 322/29 |

FOREIGN PATENT DOCUMENTS

JP       2011-239487 A    11/2011

* cited by examiner

*Primary Examiner* — Julio C. Gonzalez
(74) *Attorney, Agent, or Firm* — BACON&THOMAS, PLLC

(57) ABSTRACT

A voltage fluctuation suppressing device for an alternating current generator provided in the alternating current generator and configured to suppress voltage fluctuation by excitation control based on an output voltage includes a processor, and a memory configured to be able to communicate with the processor. The processor is configured to: detect a load current of each of output terminals; identify in-use output terminals based on the detection of the load current; detect inter-terminal voltages of the output terminals including the identified output terminals; and control excitation by using an output voltage calculated from the detected inter-terminal voltages.

3 Claims, 8 Drawing Sheets

| NO. | IN-USE OUTPUT TERMINAL | CALCULATING FORMULA OF OUTPUT VOLTAGE | THREE-PHASE | SINGLE PHASE |
|---|---|---|---|---|
| 1 | R PHASE | $(V_{T-R}+V_{R-S})/2$ | ○ | |
| 2 | S PHASE | $(V_{R-S}+V_{S-T})/2$ | ○ | |
| 3 | T PHASE | $(V_{S-T}+V_{T-R})/2$ | ○ | |
| 4 | U PHASE | $V_{U-W}$ | | ○ |
| 5 | W PHASE | $V_{U-W}$ | | ○ |
| 6 | R PHASE, S PHASE | $V_{R-S}$ | ○ | |
| 7 | R PHASE, T PHASE | $V_{T-R}$ | ○ | |
| 8 | R PHASE, U PHASE | $((V_{R-S}+V_{T-R})/2+V_{U-W})/2$ | ○ | ○ |
| 9 | R PHASE, W PHASE | $((V_{R-S}+V_{T-R})/2+V_{U-W})/2$ | ○ | ○ |
| 10 | S PHASE, T PHASE | $V_{S-T}$ | ○ | |
| 11 | S PHASE, U PHASE | $((V_{R-S}+V_{S-T})/2+V_{U-W})/2$ | ○ | ○ |
| 12 | S PHASE, W PHASE | $((V_{R-S}+V_{S-T})/2+V_{U-W})/2$ | ○ | ○ |
| 13 | T PHASE, U PHASE | $((V_{S-T}+V_{T-R})/2+V_{U-W})/2$ | ○ | ○ |
| 14 | T PHASE, W PHASE | $((V_{S-T}+V_{T-R})/2+V_{U-W})/2$ | ○ | ○ |
| 15 | U PHASE, W PHASE | $V_{U-W}$ | | ○ |
| 16 | R PHASE, S PHASE, T PHASE | $(V_{R-S}+V_{S-T}+V_{T-R})/3$ | ○ | |

*FIG. 3A*

| NO. | IN-USE OUTPUT TERMINAL | CALCULATING FORMULA OF OUTPUT VOLTAGE | THREE-PHASE | SINGLE PHASE |
|---|---|---|---|---|
| 17 | R PHASE, S PHASE, U PHASE | $(V_{R-S}+V_{U-W})/2$ | ○ | ○ |
| 18 | R PHASE, S PHASE, W PHASE | $(V_{R-S}+V_{U-W})/2$ | ○ | ○ |
| 19 | R PHASE, T PHASE, U PHASE | $(V_{T-R}+V_{U-W})/2$ | ○ | ○ |
| 20 | R PHASE, T PHASE, W PHASE | $(V_{T-R}+V_{U-W})/2$ | ○ | ○ |
| 21 | R PHASE, U PHASE, W PHASE | $((V_{R-S}+V_{T-R})/2+V_{U-W})/2$ | ○ | ○ |
| 22 | S PHASE, T PHASE, U PHASE | $(V_{S-T}+V_{U-W})/2$ | ○ | ○ |
| 23 | S PHASE, T PHASE, W PHASE | $(V_{S-T}+V_{U-W})/2$ | ○ | ○ |
| 24 | S PHASE, U PHASE, W PHASE | $((V_{R-S}+V_{S-T})/2+V_{U-W})/2$ | ○ | ○ |
| 25 | T PHASE, U PHASE, W PHASE | $((V_{S-T}+V_{T-R})/2+V_{U-W})/2$ | ○ | ○ |
| 26 | R PHASE, S PHASE, T PHASE, U PHASE | $((V_{R-S}+V_{S-T}+V_{T-R})/3+V_{U-W})/2$ | ○ | ○ |
| 27 | R PHASE, S PHASE, T PHASE, W PHASE | $((V_{R-S}+V_{S-T}+V_{T-R})/3+V_{U-W})/2$ | ○ | ○ |
| 28 | R PHASE, S PHASE, U PHASE, W PHASE | $(V_{R-S}+V_{U-W})/2$ | ○ | ○ |
| 29 | R PHASE, T PHASE, U PHASE, W PHASE | $(V_{T-R}+V_{U-W})/2$ | ○ | ○ |
| 30 | S PHASE, T PHASE, U PHASE, W PHASE | $(V_{S-T}+V_{U-W})/2$ | ○ | ○ |
| 31 | R PHASE, S PHASE, T PHASE, U PHASE, W PHASE | $((V_{R-S}+V_{S-T}+V_{T-R})/3+V_{U-W})/2$ | ○ | ○ |
| 32 | NA | $((V_{R-S}+V_{S-T}+V_{T-R})/3+V_{U-W})/2$ | ● | ● |

*FIG. 3B*

| NO. | IN-USE OUTPUT TERMINAL | CALCULATING FORMULA OF OUTPUT VOLTAGE | THREE-PHASE | SINGLE PHASE |
|---|---|---|---|---|
| 1 | R PHASE | $V_{R\text{-}O} \cdot \sqrt{3}$ | ○ | |
| 2 | S PHASE | $V_{S\text{-}O} \cdot \sqrt{3}$ | ○ | |
| 3 | T PHASE | $V_{T\text{-}O} \cdot \sqrt{3}$ | ○ | |
| 4 | U PHASE | $V_{U\text{-}O} \cdot 2$ | | ○ |
| 5 | W PHASE | $V_{W\text{-}O} \cdot 2$ | | ○ |
| 6 | R PHASE, S PHASE | $(V_{R\text{-}O}+V_{S\text{-}O}) \cdot \sqrt{3}/2$ | ○ | |
| 7 | R PHASE, T PHASE | $(V_{R\text{-}O}+V_{T\text{-}O}) \cdot \sqrt{3}/2$ | ○ | |
| 8 | R PHASE, U PHASE | $(V_{R\text{-}O} \cdot \sqrt{3}+V_{U\text{-}O} \cdot 2)/2$ | ○ | ○ |
| 9 | R PHASE, W PHASE | $(V_{R\text{-}O} \cdot \sqrt{3}+V_{W\text{-}O} \cdot 2)/2$ | ○ | ○ |
| 10 | S PHASE, T PHASE | $(V_{S\text{-}O}+V_{T\text{-}O}) \cdot \sqrt{3}/2$ | ○ | |
| 11 | S PHASE, U PHASE | $(V_{S\text{-}O} \cdot \sqrt{3}+V_{U\text{-}O} \cdot 2)/2$ | ○ | ○ |
| 12 | S PHASE, W PHASE | $(V_{S\text{-}O} \cdot \sqrt{3}+V_{W\text{-}O} \cdot 2)/2$ | ○ | ○ |
| 13 | T PHASE, U PHASE | $(V_{T\text{-}O} \cdot \sqrt{3}+V_{U\text{-}O} \cdot 2)/2$ | ○ | ○ |
| 14 | T PHASE, W PHASE | $(V_{T\text{-}O} \cdot \sqrt{3}+V_{W\text{-}O} \cdot 2)/2$ | ○ | ○ |
| 15 | U PHASE, W PHASE | $V_{U\text{-}O}+V_{W\text{-}O}$ | | ○ |
| 16 | R PHASE, S PHASE, T PHASE | $(V_{R\text{-}O}+V_{S\text{-}O}+V_{T\text{-}O})\sqrt{3}/3$ | ○ | |

*FIG. 5A*

| NO. | IN-USE OUTPUT TERMINAL | CALCULATING FORMULA OF OUTPUT VOLTAGE | THREE-PHASE | SINGLE PHASE |
|---|---|---|---|---|
| 17 | R PHASE, S PHASE, U PHASE | $((V_{R\text{-}o}+V_{S\text{-}o})\sqrt{3}/2+2V_{U\text{-}o})/2$ | ○ | ○ |
| 18 | R PHASE, S PHASE, W PHASE | $((V_{R\text{-}o}+V_{S\text{-}o})\sqrt{3}/2+2V_{W\text{-}o})/2$ | ○ | ○ |
| 19 | R PHASE, T PHASE, U PHASE | $((V_{R\text{-}o}+V_{T\text{-}o})\sqrt{3}/2+2V_{U\text{-}o})/2$ | ○ | ○ |
| 20 | R PHASE, T PHASE, W PHASE | $((V_{R\text{-}o}+V_{T\text{-}o})\sqrt{3}/2+2V_{W\text{-}o})/2$ | ○ | ○ |
| 21 | R PHASE, U PHASE, W PHASE | $(V_{R\text{-}o}\cdot\sqrt{3}+(V_{U\text{-}o}+V_{W\text{-}o}))/2$ | ○ | ○ |
| 22 | S PHASE, T PHASE, U PHASE | $((V_{S\text{-}o}+V_{T\text{-}o})\sqrt{3}/2+2V_{U\text{-}o})/2$ | ○ | ○ |
| 23 | S PHASE, T PHASE, W PHASE | $((V_{R\text{-}o}+V_{T\text{-}o})\sqrt{3}/2+2V_{W\text{-}o})/2$ | ○ | ○ |
| 24 | S PHASE, U PHASE, W PHASE | $(V_{S\text{-}o}\cdot\sqrt{3}+(V_{U\text{-}o}+V_{W\text{-}o}))/2$ | ○ | ○ |
| 25 | T PHASE, U PHASE, W PHASE | $(V_{T\text{-}o}\cdot\sqrt{3}+(V_{U\text{-}o}+V_{W\text{-}o}))/2$ | ○ | ○ |
| 26 | R PHASE, S PHASE, T PHASE, U PHASE | $((V_{R\text{-}o}+V_{S\text{-}o}+V_{T\text{-}o})\sqrt{3}/3+2V_{U\text{-}o})/2$ | ○ | ○ |
| 27 | R PHASE, S PHASE, T PHASE, W PHASE | $((V_{R\text{-}o}+V_{S\text{-}o}+V_{T\text{-}o})\sqrt{3}/3+2V_{W\text{-}o})/2$ | ○ | ○ |
| 28 | R PHASE, S PHASE, U PHASE, W PHASE | $((V_{R\text{-}o}+V_{S\text{-}o})\sqrt{3}/2+(V_{U\text{-}o}+V_{W\text{-}o}))/2$ | ○ | ○ |
| 29 | R PHASE, T PHASE, U PHASE, W PHASE | $((V_{R\text{-}o}+V_{T\text{-}o})\sqrt{3}/2+(V_{U\text{-}o}+V_{W\text{-}o}))/2$ | ○ | ○ |
| 30 | S PHASE, T PHASE, U PHASE, W PHASE | $((V_{S\text{-}o}+V_{T\text{-}o})\sqrt{3}/2+(V_{U\text{-}o}+V_{W\text{-}o}))/2$ | ○ | ○ |
| 31 | R PHASE, S PHASE, T PHASE, U PHASE, W PHASE | $((V_{R\text{-}o}+V_{S\text{-}o}+V_{T\text{-}o})\sqrt{3}/3+(V_{U\text{-}o}+V_{W\text{-}o}))/2$ | ○ | ○ |
| 32 | NA | $((V_{R\text{-}o}+V_{S\text{-}o}+V_{T\text{-}o})\sqrt{3}/3+(V_{U\text{-}o}+V_{W\text{-}o}))/2$ | ● | ● |

*FIG. 5B*

VOLTAGE FLUCTUATION SUPPRESSING DEVICE FOR ALTERNATING CURRENT GENERATOR

CROSS-REFERENCE TO RELATED APPLICATIONS

The present application claims priority from Japanese Patent Application No. 2022-091972 filed on Jun. 7, 2022, and the entire contents of which are hereby incorporated by reference.

BACKGROUND

1. Technical Field

The present invention relates to a voltage fluctuation suppressing device for an alternating current generator.

2. Related Art

There has been known an alternating current generator including three-phase (R phase, S phase, and T phase) output terminals, and a single phase (U phase and V phase) output terminals. It has been also known an alternating current generator including an AVR (automatic voltage regulator) configured to control the excitation to allow an output voltage to be a target voltage value, in order to keep the output voltage of the alternating current generator constant (see Japanese Patent Laid-Open No. 2011-239487). The entire contents of this disclosure are hereby incorporated by reference.

SUMMARY

The present invention provides a voltage fluctuation suppressing device for an alternating current generator provided in the alternating current generator and configured to suppress voltage fluctuation by excitation control based on an output voltage. The voltage fluctuation suppressing device includes a processor, and a memory configured to be able to communicate with the processor. The processor is configured to: detect a load current of each of output terminals; identify in-use output terminals based on the detection of the load current; detect inter-terminal voltages of the output terminals including the identified output terminals; and control excitation by using an output voltage calculated from the detected inter-terminal voltages.

BRIEF DESCRIPTION OF THE DRAWINGS

FIGS. 3A and 3B illustrate an example of a calculating formula table of output voltages of an output voltage calculator;

FIGS. 5A and 5B illustrate an example of a calculating formula table of output voltages according to another configuration example.

DETAILED DESCRIPTION

When the output voltage is regulated by a conventional automatic voltage regulator, the voltage between specific output terminals is measured, and the exciting current is controlled to allow the measured output voltage to be a target voltage. However, with the control by the conventional automatic voltage regulator, the difference in the voltage between the terminals is enlarged because the load is unevenly distributed. This causes a problem that the percentage of voltage fluctuation of the three-phase average output voltage (the percentage of three-phase E voltage fluctuation), or the percentage of voltage fluctuation of the single phase output voltage (the percentage of single phase voltage fluctuation) is increased with respect to a rated voltage.

In addition, in the case where the control is performed by the conventional automatic voltage regulator in the alternating current generator, when either the three-phase or the single phase is used independently, the output voltage between the terminals diverges from the target voltage due to mismatch between the output terminal connected to the load and the terminal at which the output voltage is measured. This causes a problem of worsening the percentage of voltage fluctuation.

The present invention has been achieved to solve the above-described problems. It is therefore an object of the invention to control the percentage of voltage fluctuation with respect to the rated voltage, in particular, to be able to control the percentage of voltage fluctuation with both the three-phase and the single phase when the three-phase and the single phase are used together, and to prevent the percentage of voltage fluctuation from worsening due to the mismatch between the terminal connected to the load and the terminal at which the output voltage is measured when either the three-phase or the single phase is used independently.

Hereinafter, an embodiment of the present invention will be described with reference to the drawings. In the description below, the same reference numbers in the different drawings indicate the same functional parts, and therefore repeated description for each of the drawings is omitted.

Figure 1:
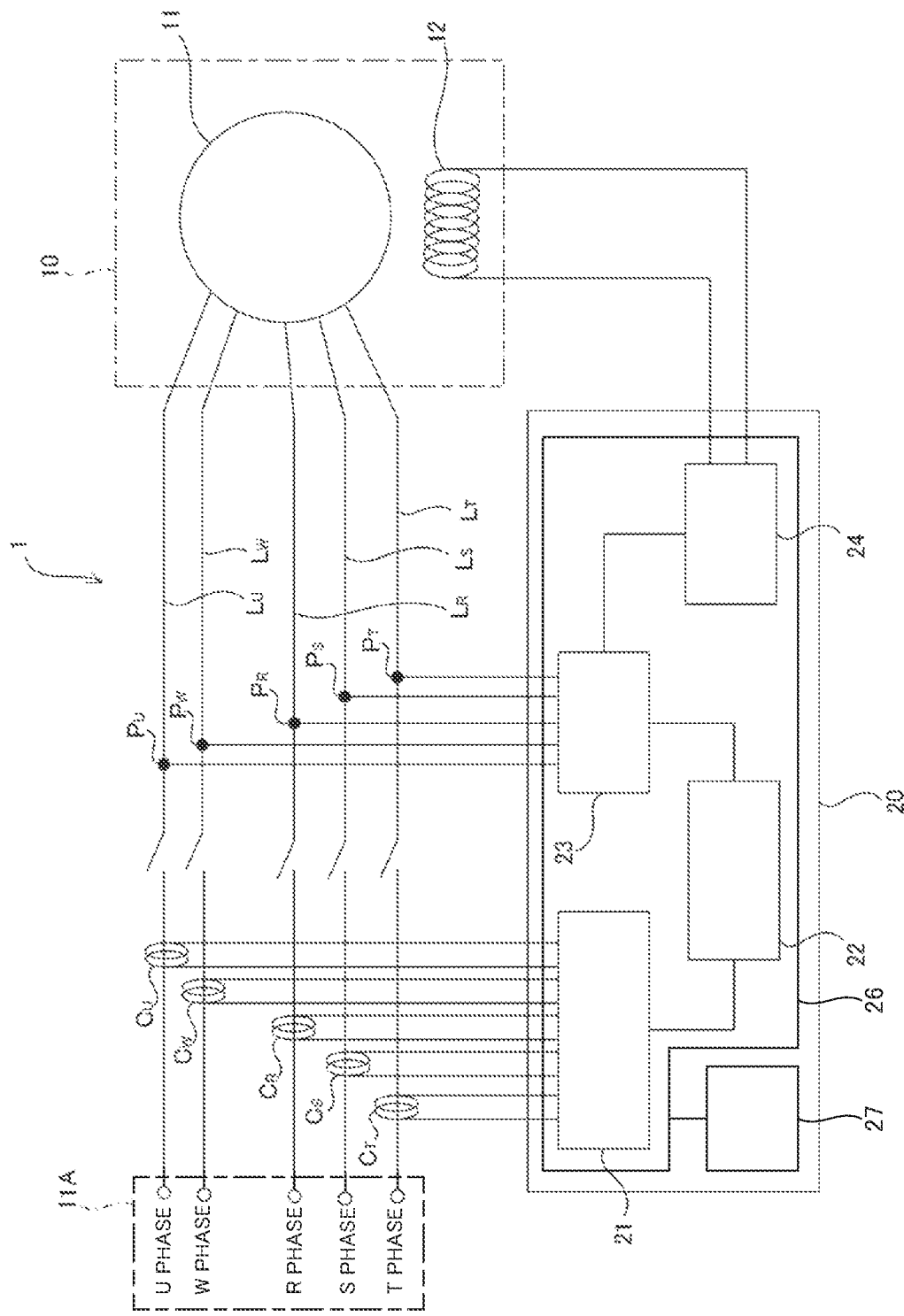
FIG. 1 illustrates a configuration example of a voltage fluctuation suppressing device for an alternating current generator according to an embodiment of the invention.

As illustrated in FIG. 1, a voltage fluctuation suppressing device 1 for an alternating current generator 10 (hereinafter, referred to simply as "voltage fluctuation suppressing device 1") is provided for the alternating current generator 10, and includes a controller 20 configured to suppress the fluctuation of the output voltage obtained from output terminals 11A of an armature 11. The controller 20 includes at least a load current detector 21, an in-use output terminal identifier 22, an inter-terminal voltage detector 23, and an excitation controller 24, as functions to perform computation. The controller 20 includes at least a processor 26, and a memory 27 configured to be able to communicate with the processor 26. The processor 26 reads a program stored in the memory 27 to function as the load current detector 21, the in-use output terminal identifier 22, the inter-terminal voltage detector 23, and the excitation controller 24.

The load current detector 21 of the controller 20 detects a load current flowing through the output terminals 11A of the armature 11. With the illustrated example, the armature 11 includes three-phase output terminals (R phase terminal, S phase terminal, and T phase terminal), and single phase output terminals (U phase terminal and W phase terminal). Here, the load current is detected via current detectors $C_R$, $C_S$, $C_T$, $C_U$, and $C_W$ provided on wires $L_R$, $L_S$, $L_T$, $L_U$ and $L_W$ configured to connect armature windings of the armature 11 to the output terminals 11A, respectively, and the detected load current is inputted to the load current detector 21.

With the illustrated example, the output terminals 11A of the armature 11 include the R phase terminal, the S phase terminal, the T phase terminal, the U phase terminal, and the W phase terminal, but this is by no means limiting. The armature 11 may not be limited as long as it includes three-phase output terminals formed by a Y connection or a triangle connection of the armature windings. In this case, the individual single phase output terminals (the U phase terminal and the W phase terminal) may be eliminated, and the R phase terminal, the S phase terminal, and the T phase terminal may be used as three-phase output terminals or single phase output terminals in a three-phase generator.

The in-use output terminal identifier 22 of the controller 20 identifies the output terminals 11A from which the load current is detected, based on the detection of the load current detector 21. To be more specific, when the load current is detected from all the wires $L_R$, $L_S$, $L_T$, $L_U$ and $L_W$, the in-use output terminal identifier 22 identifies both the three-phase output terminals (R phase terminal, S phase terminal, and T phase terminal) and the single phase output terminals (U phase terminal and W phase terminal) as the in-use output terminals. Meanwhile, when the load current is detected from any of the wires $L_R$, $L_S$, $L_T$, $L_U$ and $L_W$, the in-use output terminal identifier 22 identifies the output terminal of the wire from which the load current is detected, as the in-use output terminal.

The inter-terminal voltage detector 23 of the controller 20 detects inter-terminal voltages via detection points $P_R$, $P_S$, $P_T$, $P_U$, and $P_W$ provided on the wire $L_R$, $L_S$, $L_T$, $L_U$ and $L_W$, respectively. In this case, the inter-terminal voltage detector 23 detects inter-terminal voltages of the output terminals including the in-use output terminals identified by the in-use output terminal identifier 22.

That is, when both the three-phase output terminals (the R phase terminal, the S phase terminal, and the T phase terminal), and the single phase output terminals (the U phase terminal and the W phase terminal) are identified as the in-use output terminals (when the three-phase and the single phase are used together), the inter-terminal voltage detector 23 detects all of inter-terminal voltages $V_{R-S}$, $V_{S-T}$, $V_{T-R}$, and $V_{U-W}$ between R and S, between S and T, between T and R, and between U and W, respectively. When only the three-phase output terminals (the R phase terminal, the S phase terminal, and the T phase terminal) are identified as the in-use output terminals (when the three-phase is used independently), the inter-terminal voltage detector 23 detects the inter-terminal voltages $V_{R-S}$, $V_{S-T}$, and $V_{T-R}$ between R and S, between S and T, and between T and R, respectively. Meanwhile, when only the single phase output terminals (U phase terminal and W phase terminal) are identified as the in-use output terminals (when the single phase is used independently), the inter-terminal voltage detector 23 detects the inter-terminal voltage $V_{U-W}$ between U and W.

Then, the excitation controller 24 of the controller 20 calculates the output voltage by using the voltage values of the inter-terminal voltages detected by the inter-terminal voltage detector 23, that is, only the inter-terminal voltages of the output terminals including the identified in-use output terminals, and controls the excitation to allow the output voltage to be a target voltage. By this means, it is possible to calculate the output voltage only from the inter-terminal voltages of the output terminals 11A actually being used. The excitation current flowing through an exciting coil 12 of the alternating current generator 10 is controlled based on the output voltage, and therefore it is possible to suppress the voltage fluctuation of the output voltage.

The excitation controller 24 may control the excitation based on the output voltage which is an instantaneous value of the inter-terminal voltage detected by the inter-terminal voltage detector 23, or based on the output voltage calculated by computing the inter-terminal voltage detected by the inter-terminal voltage detector 23.

In the case where the instantaneous value is used as the output voltage, as an example, the percentage of fluctuation with respect to the rated voltage is calculated as needed, and when the percentage of fluctuation exceeds a threshold, the target voltage is reset. In this case, when both the three-phase output terminals (the R phase terminal, the S phase terminal, and the T phase terminal) and the single phase output terminals (the U phase terminal and the W phase terminal) are identified as the in-use output terminals, the target voltage is increased when the percentage of fluctuation of the three-phase or the single phase reaches the lower limit, and the target voltage is reduced when the percentage of fluctuation of the three-phase or the single phase reaches the upper limit. Then, the target voltage is increased and reduced a set number of times (several times) at a set interval (several seconds), and the output voltage is regulated by the PID control to allow the percentage of fluctuation of the three-phase to be within an allowance (for example, plus or minus 2.5%). In this case, it is preferred that the threshold of the percentage of fluctuation of the three-phase is equal to or smaller than 2.5%, and the percentage of fluctuation of the single phase is equal to or smaller than 3.5%.

Figure 2:
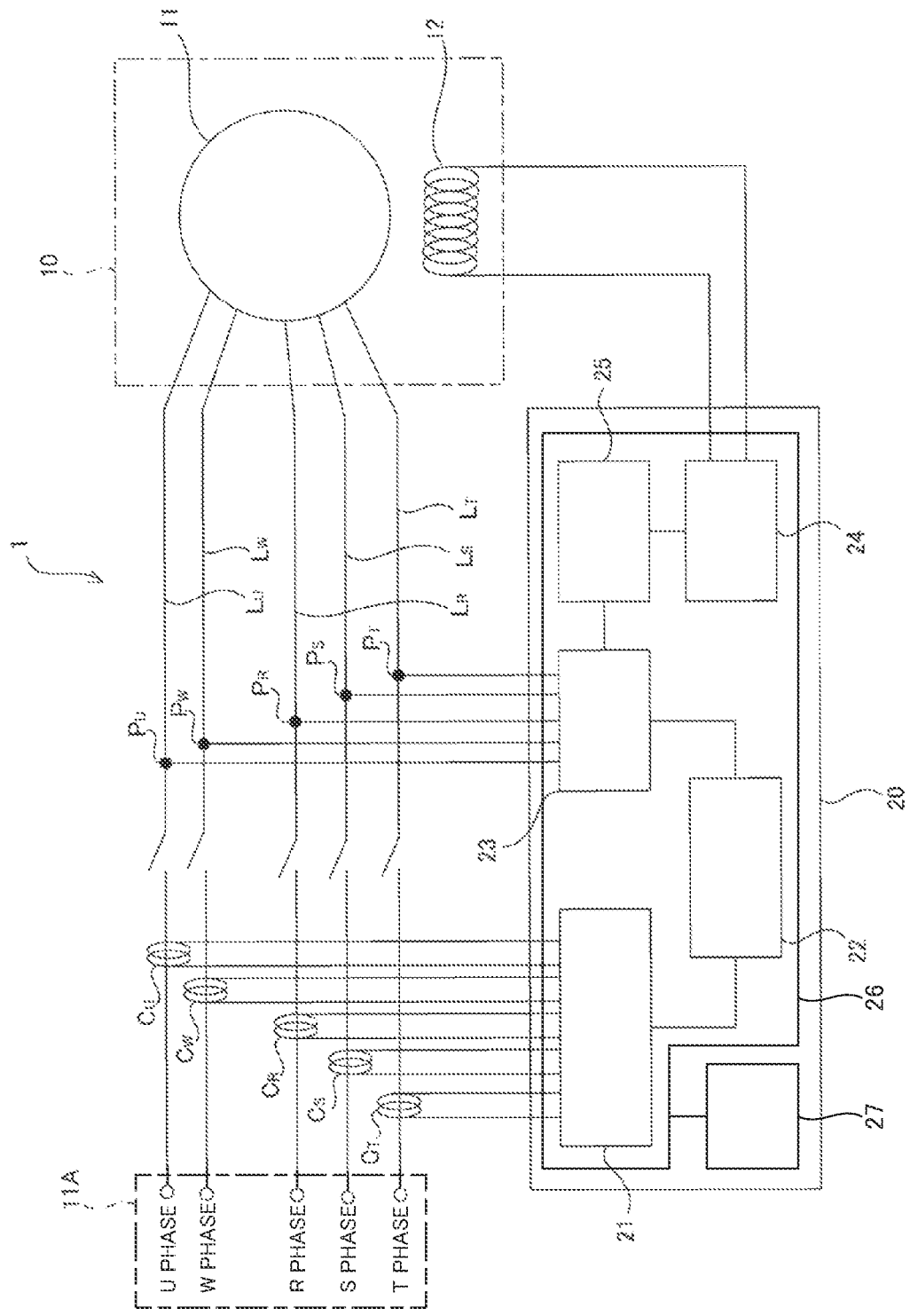
FIG. 2 illustrates another configuration example of the voltage fluctuation suppressing device for an alternating current generator according to an embodiment of the invention.

When the output voltage is calculated by the computation, an output voltage calculator 25 is provided for the detected value of the inter-terminal voltage detector 23 as illustrated in FIG. 2, and the excitation is controlled by using the output voltage calculated by the output voltage calculator 25. In this case, the output voltage calculated by the output voltage calculator 25 covers the inter-terminal voltages of all of the in-use output terminals. The processor 26 reads the program stored in the memory 27 to function as the output voltage calculator 25.

An example of the output voltage calculator 25 calculates an average value of the detected inter-terminal voltages as the output voltage, when either the three-phase output terminals (the R phase terminal, the S phase terminal, and the T phase terminal), or the single phase output terminals (the U phase terminal and the W phase terminal) are identified as the in-use output terminals by the in-use output terminal identifier 22, and used independently. Meanwhile, when both the three-phase output terminals (the R phase terminal, the S phase terminal, and the T phase terminal), and the single phase output terminals (the U phase terminal and the W phase terminal) are identified as the in-use output terminals by the in-use output terminal identifier 22, and used together, the average value of the inter-terminal voltages of the three-phase output terminals (the R phase terminal, the S phase terminal, and the T phase terminal) is calculated as a first average value (three-phase E voltage), and the average value obtained by averaging the inter-terminal voltage of the single phase output terminals (the U phase terminal and the W phase terminal) and the first average value (the three-phase E voltage) is calculated as a second average value which is the output voltage.

An example of a calculating formula table of output voltages of the output voltage calculator 25 is illustrated in FIGS. 3A and 3B. In this calculating formula table, No 1 to No. 3 indicate cases where the three-phase output terminals (the R phase terminal, the S phase terminal, and the T phase terminal) are used independently, and one of them is identified as the in-use output terminal. In these cases, the average value of two of the inter-terminal voltages ($V_{R-S}$, $V_{S-T}$, and $V_{T-R}$) of the tree-phase output terminals including the one in-use output terminal is calculated as an output voltage.

In addition, No. 4 and No. 5 indicate cases where the single phase output terminals (the U phase terminal and the W phase terminal) are used independently, and one of them is identified as the in-use output terminal. No. 15 indicates a case where the single phase output terminals (the U phase terminal and the W phase terminal) are used independently, and two of them are identified as the in-use output terminals. In these cases, the inter-terminal voltage $V_{U-R}$ of the single phase output terminals is calculated as an output voltage.

No. 6 and No. 7 indicate cases where the three-phase output terminals (the R phase terminal, the S phase terminal, and the T phase terminal) are used independently, and two of them are identified as the in-use output terminals. In these cases, the inter-terminal voltage of the identified two in-use output terminals is calculated as an output voltage. In addition, No. 16 indicates a case where the three-phase output terminals (the R phase terminal, the S phase terminal, and the T phase terminal) are used independently, and all of them are identified as the in-use output terminals. In this case, the average value (($V_{R-S}+V_{S-T}+V_{T-R}$)/3) of the inter-terminal voltages ($V_{R-S}$, $V_{S-T}$, and $V_{T-R}$) is calculated as an output voltage.

The other numbers in the calculating formula table illustrated in FIGS. 3A and 3B indicate cases where the three-phase and the single phase are used together. In these case, the average value of the inter-terminal voltages of the three-phase output terminals including the in-use output terminals is calculated as a first average value, and the average value obtained by averaging the first average value and the inter-terminal voltage of the single phase output terminals is calculated as a second average value which is an output voltage.

Here, the example where the average value is calculated by the computation of the output voltage calculator 25 is presented. However, the computation of the output voltage calculator 25 is not limited to this example. For example, the output voltage may be calculated by various computations, for example, a median value is calculated in addition to or instead of the average value, or correction or conversion is performed by multiplication of specific coefficients.

Figure 4:
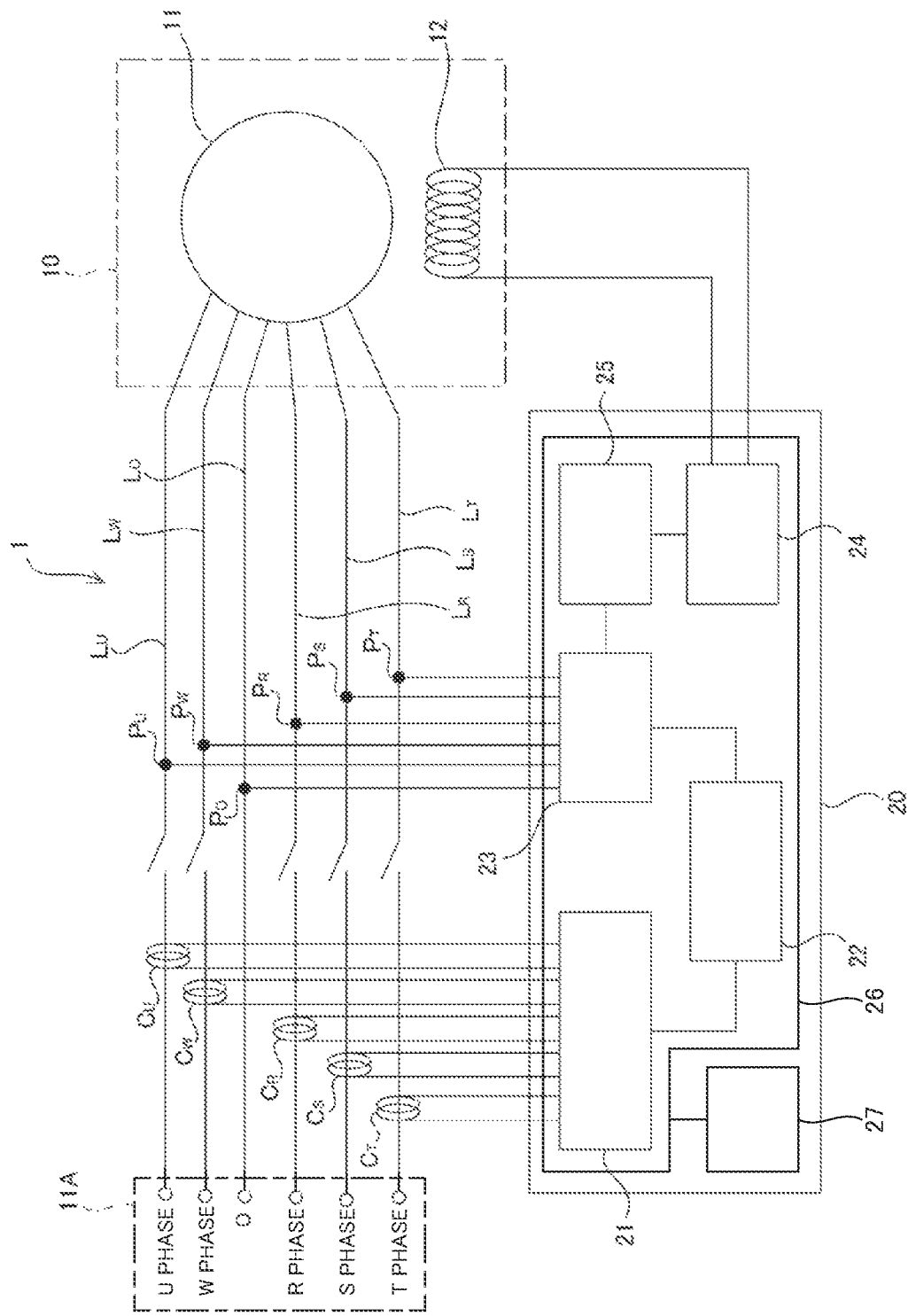
FIG. 4 illustrates another configuration example of the voltage fluctuation suppressing device for an alternating current generator according to an embodiment of the invention.

FIG. 4 illustrates another configuration example of the voltage fluctuation suppressing device according to an embodiment of the invention. In the voltage fluctuation suppressing device 1 illustrated in FIG. 4, the armature 11 has a neutral point, and a detecting point Po of the inter-terminal voltage detector 23 is provided on a wire Lo connecting to a terminal for the neutral point (neutral point terminal) O. In this example, the detected inter-terminal voltages of all the output terminals (the R phase terminal, the S phase terminal, the T phase terminal, the U phase terminal, and the W phase terminal) are phase voltages ($V_{R-O}$, $V_{S-O}$, $V_{T-O}$, $V_{U-O}$, and $V_{W-O}$) between the neutral point terminal O and the respective output terminals.

FIGS. 5A and 5B illustrate an example of the calculating formula table of the output voltages of the output voltage calculator 25 illustrated in FIG. 4. With this example, all the calculating formulas (No. 1 to No. 32) calculate output voltages by using the phase voltages of the output terminals identified by the in-use output terminal identifier 22. By this means, it is certainly possible to calculate the output voltage corresponding to the load. The usage conditions of the three-phase and the single phase in No. 1 to No. 32 of FIGS. 5A and 5B correspond to the usage conditions illustrated in FIGS. 3A and 3B.

Here, in the calculating formula tables illustrated in FIGS. 3A and 3B as well as FIGS. 5A and 5B, No. 32 indicates a case where no current is detected from all of the output terminals (the R phase terminal, the S phase terminal, the T phase terminal, the U phase terminal, and the W phase terminal). In this case, it is supposed that an error of the current detection has occurred, and therefore the output voltage is calculated assuming that the current flows through all of the output terminals (all of the output terminals are in-use output terminals).

Figure 6:
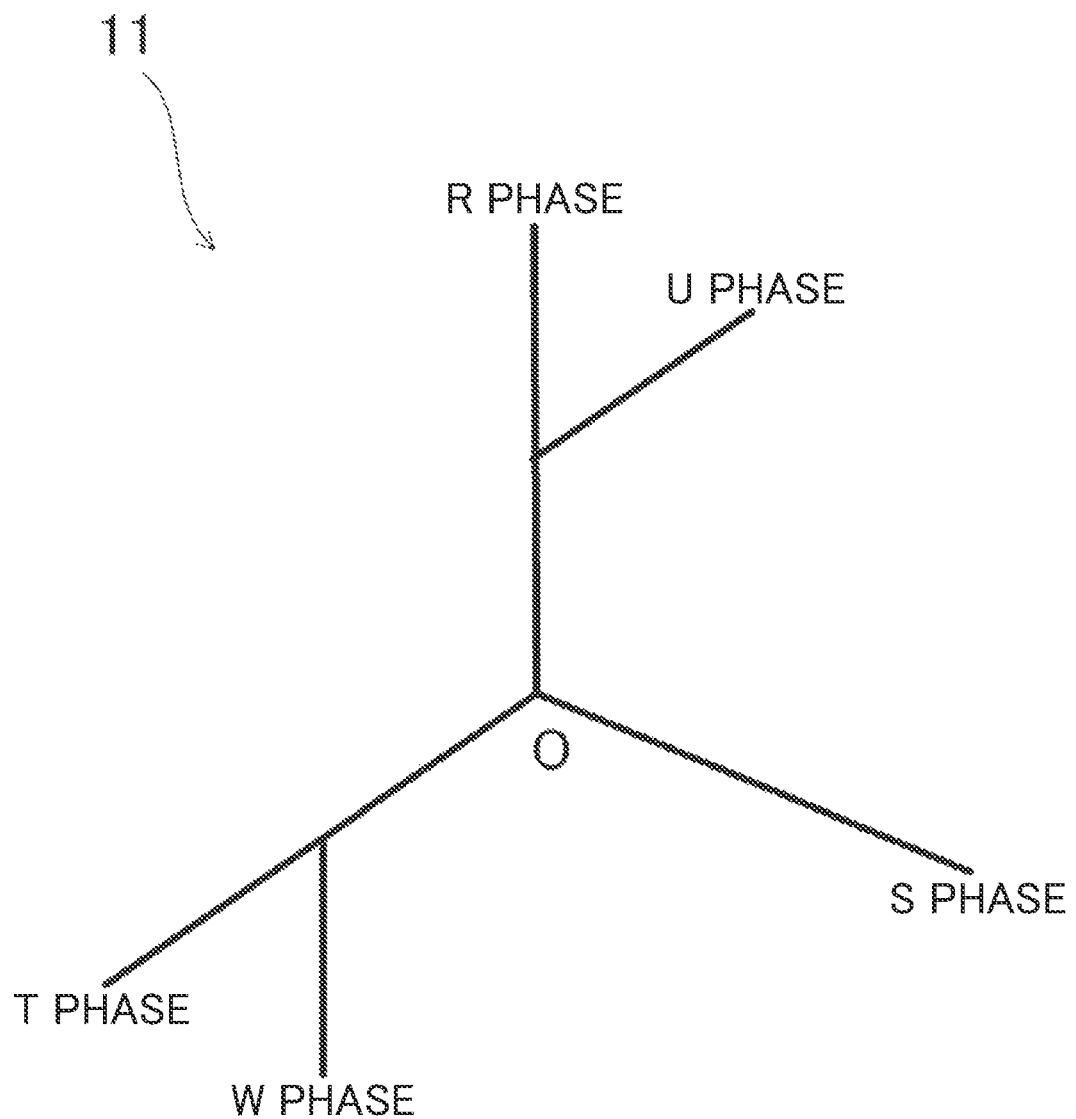
FIG. 6 illustrates an example of the connection of armature windings of an armature of an alternating current generator.

As described above, the connection of the armature windings of the armature 11 is not particularly limited, but a connection illustrated in FIG. 6 may be adopted as an example. With this example, the armature windings having the single phase output terminals (the U phase terminal and the W phase terminal) are connected to a three-phase connection of the armature wirings having the three-phase output terminals (the R phase terminal, the S phase terminal, and the T phase terminal). To be more specific, the three-phase output terminals (the R phase terminal, the S phase terminal, and the T phase terminal) are one ends of three armature windings whose other ends are Y-connected to the neutral point O, and the single phase output terminals (the U phase terminal and the W phase terminal) are ends of two armature windings whose other ends are connected to the middle points of two of the three armature windings. Here, FIG. 6 merely illustrates an example, and the armature 11 is not limited as long as the three-phase and the single phase can be used independently of one another or together.

As described above, the voltage fluctuation suppressing device 1 according to the embodiment of the invention detects the load current for each of the output terminals to identify the output terminals actually being used; calculates the output voltage only from the inter-terminal voltages of the output terminals being used; and controls the excitation to allow the output voltage to be the target voltage. By this means, in any of the case where the three-phase is used independently, the case where the single phase is used independently, and the case where the three-phase and the single phase are used together, it is possible to control to allow an optimal output voltage for the load connected to each of the output terminals without particularly switching the connection for the detection.

By this means, it is possible to control the percentage of voltage fluctuation with respect to the rated voltage of the alternating current generator, and, when the three-phase output terminals and the single phase output terminals are used together, the excitation is controlled by using the output voltage based on the inter-terminal voltages of the three-phase output terminals and the inter-terminal voltage of the single phase output terminals. Therefore, it is possible to control the percentage of voltage fluctuation with both the three-phase output terminals and the single phase output terminals.

In addition, when either the three-phase output terminals or the single phase output terminals are used independently, the inter-terminal voltage is detected after the terminals being used are identified, and the excitation is controlled by using the output voltage calculated from the detected inter-terminal voltage. Therefore, it is possible to prevent the percentage of voltage fluctuation from worsening due to the mismatch between the output terminals being used and the terminals being detected.

Moreover, the voltage fluctuation suppressing device 1 according to the embodiment of the invention can control the percentage of voltage fluctuation for a generator capable of using the three-phase and the single phase together. Not only that, in a case of a three-phase generator including only three-phase output terminals, even when the terminals are used as single phase output terminals, it is possible to control the percentage of voltage fluctuation by identifying the output terminals based on the load current.

As described above, according to the invention, it is possible to control the percentage of voltage fluctuation with respect to the rated voltage, and when the three-phase output terminals and the single phase output terminals are used together, the excitation is controlled by using the output voltage based on the inter-terminal voltages of the three-phase output terminals and the inter-terminal voltage of the single phase output terminal. Therefore, it is possible to control the percentage of voltage fluctuation with both the three-phase and the single phase.

Moreover, when either the three-phase output terminals or the single phase output terminals are used independently, the inter-terminal voltage is detected after the terminals being used are identified, and the excitation is controlled by using the output voltage calculated from the detected inter-terminal voltage. Therefore, it is possible to prevent the percentage of voltage fluctuation from worsening due to the mismatch between the output terminals being used and the terminals being detected.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. A voltage fluctuation suppressing device for an alternating current generator provided in the alternating current generator and configured to suppress voltage fluctuation by excitation control based on an output voltage, the alternating current generator comprising a plurality of output terminals including at least one of three-phase output terminals and single phase output terminals, and the voltage fluctuation suppressing device comprising:

a processor; and a memory configured to be able to communicate with the processor, the processor being configured to:

detect a load current of each of the plurality of output terminals;

identify an in-use output terminals based on the detection of the load current;

detect inter-terminal voltages between the identified terminal and other terminals included in the three-phase output terminals when the identified output terminal is included in the three-phase output terminals and detect an inter-terminal voltage of the single phase output terminals when the identified output terminal is included in the single phase output terminals; and control excitation by using an output voltage calculated from the detected inter-terminal voltages of the three-phase output terminals and/or the detected inter-terminal voltage of the single phase output terminals to calculate the output voltage; and control the execution by using the calculated output voltage, wherein when the three-phase output terminals and single phase output terminals are in-use output terminals, the processor is further configured to calculate the output voltage such that an average value of the inter-terminal voltages of the three-phase output terminals is calculated as a first average value, and an average value obtained by averaging the inter-terminal voltage of the single phase output terminals and the first average value is calculated as a second average value which is the output voltage.

2. The voltage fluctuation suppressing device for an alternating current generator according to claim 1, wherein the processor is further configured to calculate the output voltage which is an average value of the detected inter-terminal voltages, when the in-use output terminal is included in the three-phase output terminals and is not included in the single phase output terminals.

3. The voltage fluctuation suppressing device for an alternating current generator according to claim 1, wherein the alternating current generator includes armature windings connected such that the armature windings having single phase output terminals are connected to a three-phase connection of the armature windings having three-phase output terminals.

* * * * *